(12) United States Patent
Obzhirov

(10) Patent No.: US 9,584,703 B2
(45) Date of Patent: Feb. 28, 2017

(54) METHOD AND APPARATUS FOR FINDING DATA QUANTISATION ERROR

(75) Inventor: Anton Obzhirov, London (GB)

(73) Assignee: Nokia Technologies Oy, Espoo (FI)

( * ) Notice: Subject to any disclaimer, the term of this patent is extended or adjusted under 35 U.S.C. 154(b) by 1287 days.

(21) Appl. No.: 13/142,733

(22) PCT Filed: Dec. 28, 2009

(86) PCT No.: PCT/FI2009/051036
§ 371 (c)(1),
(2), (4) Date: Jul. 17, 2012

(87) PCT Pub. No.: WO2010/076382
PCT Pub. Date: Jul. 8, 2010

(65) Prior Publication Data
US 2013/0011076 A1    Jan. 10, 2013

(30) Foreign Application Priority Data

Dec. 31, 2008 (GB) .................................. 0823701.8

(51) Int. Cl.
| | |
|---|---|
| G06K 9/00 | (2006.01) |
| H04N 1/64 | (2006.01) |
| H04N 1/52 | (2006.01) |
| H04N 19/132 | (2014.01) |
| H04N 19/186 | (2014.01) |
| H04N 19/182 | (2014.01) |
| H04N 19/90 | (2014.01) |
| H04N 19/34 | (2014.01) |

(52) U.S. Cl.
CPC ............... *H04N 1/644* (2013.01); *H04N 1/52* (2013.01); *H04N 19/132* (2014.11); *H04N 19/182* (2014.11); *H04N 19/186* (2014.11); *H04N 19/34* (2014.11); *H04N 19/90* (2014.11)

(58) Field of Classification Search
None
See application file for complete search history.

(56) References Cited

U.S. PATENT DOCUMENTS 4,926,246 A * 5/1990 Darling ................. H04N 19/90
348/574
5,031,050 A   7/1991 Chan
(Continued)

FOREIGN PATENT DOCUMENTS

| EP | 0309149 A1 | 3/1989 |
| EP | 1429539 A2 | 6/2004 |
| WO | 2010076382 A1 | 7/2010 |

OTHER PUBLICATIONS

European Search Report received for Patent Application No. 09836127.2, dated Dec. 12, 2012, 5 pages.
(Continued)

*Primary Examiner* — Andrae S Allison
(74) *Attorney, Agent, or Firm* — Harrington & Smith

(57) ABSTRACT

A method, apparatus, and computer program product storing pre-calculated quantization error data relating to a data quantization process. After receiving data to be quantized, quantizing the data to reduce the number of significant bits present therein. Finally, a quantization error is determined for the quantized data from the pre-calculated quantization error data.

14 Claims, 9 Drawing Sheets

(56) References Cited

U.S. PATENT DOCUMENTS

| | | | | |
|---|---|---|---|---|
| 5,204,665 | A | * | 4/1993 | Bollman .................. G09G 5/02 345/593 |
| 5,455,600 | A | | 10/1995 | Friedman et al. |
| 5,553,200 | A | | 9/1996 | Accad |
| 6,172,768 | B1 | | 1/2001 | Yamada et al. |
| 6,559,976 | B1 | * | 5/2003 | Hirota .................. H04N 1/6072 358/2.1 |
| 2001/0028749 | A1 | * | 10/2001 | Kimura .................... G06T 9/40 382/240 |
| 2003/0031373 | A1 | * | 2/2003 | Kempf .................... G09G 3/20 382/251 |
| 2003/0038953 | A1 | * | 2/2003 | Damera-Venkata ..... H04N 1/52 358/1.9 |
| 2003/0059084 | A1 | * | 3/2003 | Miyake .................. G06T 1/005 382/100 |
| 2004/0207879 | A1 | * | 10/2004 | Bailey .................. H04N 1/4052 358/3.03 |
| 2005/0225806 | A1 | * | 10/2005 | Damera-Venkata . H04N 1/4056 358/3.03 |
| 2006/0132847 | A1 | | 6/2006 | Xu et al. |
| 2006/0171602 | A1 | * | 8/2006 | Ernst ........................ G06T 5/00 382/248 |
| 2006/0193009 | A1 | * | 8/2006 | Kakutani ............. H04N 1/4057 358/3.03 |
| 2007/0171475 | A1 | | 7/2007 | Cuciurean-Zapan et al. |

OTHER PUBLICATIONS

Inki, Mika, "JPEG Artifact Removal Using Error Distributions of Linear Coefficient Estimates", 10 pages.

International Search Report and Written Opinion received for corresponding Patent Cooperation Treaty Application No. PCT/FI2009/051036, dated Apr. 19, 2010, 13 pages.

International Preliminary Report for corresponding Patent Cooperation Treaty Application No. PCT/FI2009/051036, dated Jul. 5, 2011, 9 pages.

Supplemental European Search Report received for Patent Application No. 09836127.2, dated Jan. 8, 2013, 2 pages.

Search Report received for corresponding United Kingdom Patent Application No. 0823701.8, dated Jan. 27, 2009, 4 pages.

\* cited by examiner

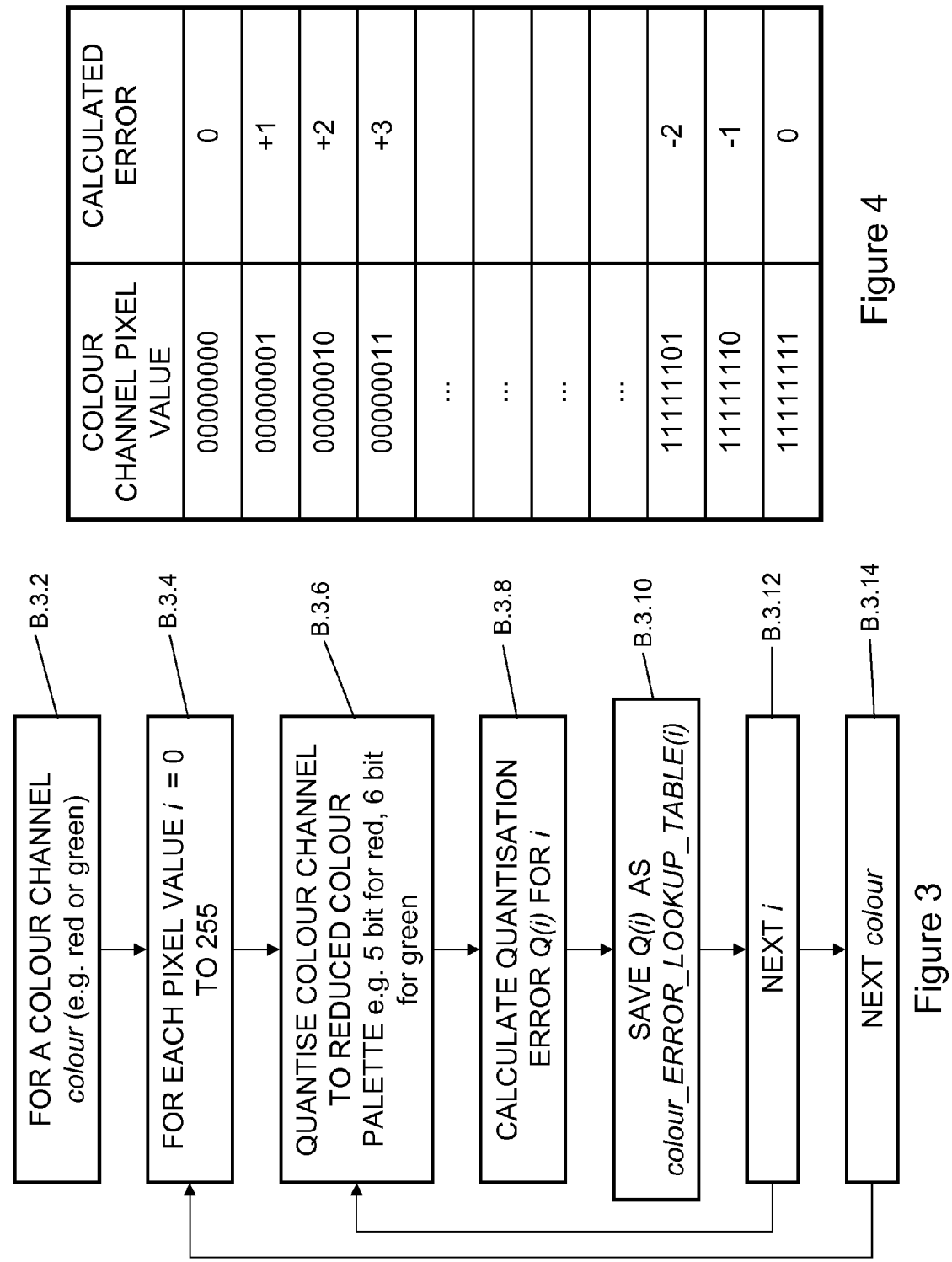

| Operation - quantise 24bbp to 16bbp | Red | Green | Blue |
|---|---|---|---|
| 24bbp input pixel[x][y] | $r_1\ r_2\ r_3\ r_4\ r_5\ r_6\ r_7\ r_8$ | $g_1\ g_2\ g_3\ g_4\ g_5\ g_6\ g_7\ g_8$ | $b_1\ b_2\ b_3\ b_4\ b_5\ b_6\ b_7\ b_8$ |
| (7.1) Bit Mask to obtain quantised values | &0xf8 =&11111000<br>= $r_1\ r_2\ r_3\ r_4\ r_5\ 000$ | &0xfc =&11111100<br>= $g_1\ g_2\ g_3\ g_4\ g_5\ g_6\ 00$ | &0xf8 =&11111000<br>= $b_1\ b_2\ b_3\ b_4\ b_5\ 000$ |
| (7.2) Bit shift to pad to 16 bits | <<8<br>=<br>$r_1 r_2 r_3 r_4 r_5 00000000000$ | <<3<br>=<br>$00000 g_1 g_2 g_3 g_4 g_5 g_6 000$ | >>3<br>=<br>$00000000000 b_1 b_2 b_3 b_4 b_5$ |
| (7.3) Bitwise OR on 16 bit words (\|) to combine | $r_1\ r_2\ r_3\ r_4\ r_5\ 0\ 0\ 0\ 0\ 0\ 0\ 0\ 0\ 0\ 0\ 0$<br>\| $0\ 0\ 0\ 0\ 0\ g_1\ g_2\ g_3\ g_4\ g_5\ g_6\ 0\ 0\ 0\ 0\ 0$<br>\| $0\ 0\ 0\ 0\ 0\ 0\ 0\ 0\ 0\ 0\ 0\ b_1\ b_2\ b_3\ b_4\ b_5$<br>= $r_1\ r_2\ r_3\ r_4\ r_5\ g_1\ g_2\ g_3\ g_4\ g_5\ g_6 b_1\ b_2\ b_3\ b_4\ b_5$ | | |

Figure 7

| Operation – find quantisation error | Red | Green | Blue |
|---|---|---|---|
| 64kpixel (16bit) input | $r_1 r_2 r_3 r_4 r_5 g_1 g_2 g_3 g_4 g_5 g_6 b_1 b_2 b_3 b_4 b_5$ | | |
| (8.1) 16 bit Bit Mask to obtain individual colour channel values | &0xF800 =1111100000000000 = $r_1 r_2 r_3 r_4 r_5 00000000000$ | &0x07E0 =0000011111100000 = $00000 g_1 g_2 g_3 g_4 g_5 g_6 00000$ | &0x001F =0000000000011111 = $00000000000 b_1 b_2 b_3 b_4 b_5$ |
| (8.2) Bit shift to obtain 8 bit per channel | >> 8 = $r_1 r_2 r_3 r_4 r_5 000$ | >> 3 = $g_1 g_2 g_3 g_4 g_5 g_6 00$ | << 3 = $b_1 b_2 b_3 b_4 b_5 000$ |
| (8.3) Fill in 0 bits with MSBs | red = red + red >> 5 = $r_1 r_2 r_3 r_4 r_5 r_1 r_2 r_3$ | green = green + green >> 6 = $g_1 g_2 g_3 g_4 g_5 g_6 g_1 g_2$ | blue = blue + blue >> 5 = $b_1 b_2 b_3 b_4 b_5 b_1 b_2 b_3$ |
| (8.4) calculate 24bbp RGB value from colour channels | newpixel = RGB (red, green, blue) | | |
| (8.5) quantisation error calculated | quant_error = pixel[x][y] − newpixel | | |

Figure 8

| Operation – pre-calculate QE LUTs | Red | Green |
|---|---|---|
| input $i$ = 00000000 to 11111111 | $i_1 i_2 i_3 i_4 i_5 i_6 i_7 i_8$ | $i_1 i_2 i_3 i_4 i_5 i_6 i_7 i_8$ |
| (9.1) Bit Mask (bitwise AND) to obtain quantised values | $\&0xf8 = \&11111000$ $= i_1 i_2 i_3 i_4 i_5 000$ | $\&0xfc = \&11111100$ $= i_1 i_2 i_3 i_4 i_5 i_6 00$ |
| (9.2) Bit shift of masked bits to obtain LSBs | $>>5$ $= 00000 i_1 i_2 i_3$ | $>>6$ $= 000000 i_1 i_2$ |
| (9.3) Bitwise OR (\|) on 8 bit words from (9.1) and (9.2) to combine for each channel | $i_1 i_2 i_3 i_4 i_5 000 \mid 00000 i_1 i_2 i_3$ $= i_1 i_2 i_3 i_4 i_5 i_1 i_2 i_3$ | $i_1 i_2 i_3 i_4 i_5 i_6 00 \mid 000000 i_1 i_2$ $= i_1 i_2 i_3 i_4 i_5 i_6 i_1 i_2$ |
| (9.4) quantisation error = $i$ – (9.3) | $Q(i) =$ $i_1 i_2 i_3 i_4 i_5 i_6 i_7 i_8 -$ $i_1 i_2 i_3 i_4 i_5 i_1 i_2 i_3$ | $Q(i) =$ $i_1 i_2 i_3 i_4 i_5 i_6 i_7 i_8 -$ $i_1 i_2 i_3 i_4 i_5 i_6 i_1 i_2$ |
| (9.5) store in quantisation error LUT | red_error_lookup_table[i] = $Q(i)$ | green_error_lookup_table[i] = $Q(i)$ |

Figure 9

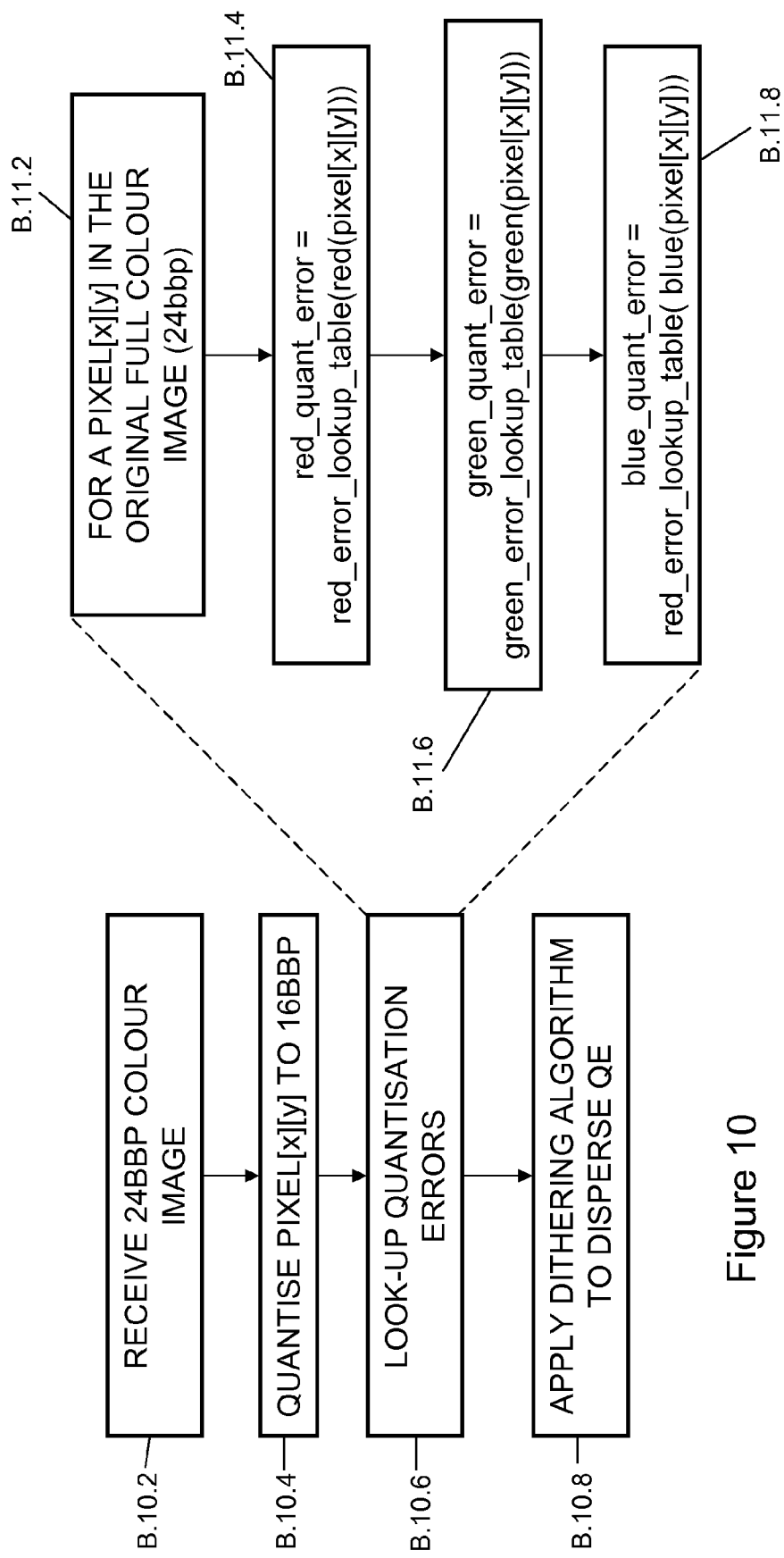

METHOD AND APPARATUS FOR FINDING DATA QUANTISATION ERROR

RELATED APPLICATION

This application was originally filed as Patent Cooperation Treaty Application No. PCT/FI2009/051036 filed Dec. 28, 2009, which claims priority to Great Britain Application No. 0823701.8 filed Dec. 31, 2008.

TECHNICAL FIELD

Examples of the present invention relate to a method and apparatus that finds a data quantisation error following a data quantisation process. In one example the data quantisation error that is found is an image pixel quantisation error used in an image dithering technique.

BACKGROUND TO THE INVENTION

Colour quantisation is the process of a higher colour image, such as a true colour (24 bits per pixel (bpp)) image where red, green and blue (RGB) channels are each represented by 8 bits, being converted to a lower colour image, such as a 16 bpp image, where the RGB channels are represented by fewer bits (typically 5 bits each for red and blue, and 6 bits for green). A quantisation error may result, which can then be dispersed to neighbouring pixels, using dithering and error dispersion algorithms, such as the Floyd-Steinberg algorithm.

SUMMARY OF THE INVENTION

Various examples of the invention are set out in the claims.

According to a first aspect, the invention provides a method, comprising: storing pre-calculated quantisation error data relating to a data quantisation process; receiving data to be quantised; quantising the data to reduce the number of significant bits thereof; and determining a quantisation error for the quantised data from the pre-calculated quantisation error data.

According to a second aspect, the invention provides a method, comprising: generating quantisation error data relating to a data quantisation process, and storing the quantisation error data for subsequent use in the data quantisation process.

According to a third aspect the invention provides an apparatus, comprising at least one processor; and at least one memory including computer program code, the at least one memory and the computer program code configured to, with the at least one processor, cause the apparatus to perform at least the following: store pre-calculated quantisation error data relating to a data quantisation process; receive data to be quantised; quantise the data to reduce the number of significant bits thereof; and determine a quantisation error for the quantised data from the pre-calculated quantisation error data.

According to a fourth aspect the invention provides an apparatus, comprising at least one processor; and at least one memory including computer program code, the at least one memory and the computer program code configured to, with the at least one processor, cause the apparatus to perform at least the following: generate quantisation error data relating to a data quantisation process, and store the quantisation error data for subsequent use in the data quantisation process.

According to a fifth aspect the invention provides an apparatus, comprising: means for storing pre-calculated quantisation error data relating to a data quantisation process; means for receiving data to be quantised; means for quantising the data to reduce the number of significant bits thereof; and means for determining a quantisation error for the quantised data from the pre-calculated quantisation error data.

According to a sixth aspect the invention provides an apparatus, comprising: data storage in which is stored pre-calculated quantisation error data relating to a data quantisation process; an input at which in use data to be quantised is received; and a quantiser that in use quantises the data to reduce the number of significant bits thereof; wherein a quantisation error for the quantised data is looked up from the pre-calculated quantisation error data in the data storage.

According to a seventh aspect the invention provides an apparatus, comprising: means for generating quantisation error data relating to a data quantisation process, and means for storing the quantisation error data for subsequent use in the data quantisation process.

According to an eighth aspect the invention provides an apparatus, comprising: a data generator configured in use to generate quantisation error data relating to a data quantisation process; and data storage that in use stores the generated quantisation error data for subsequent use in the data quantisation process.

According to a ninth aspect the invention provides a computer program, comprising: code for storing pre-calculated quantisation error data relating to a data quantisation process; code for receiving data to be quantised; code for quantising the data to reduce the number of significant bits thereof; and code for determining a quantisation error for the quantised data from the pre-calculated quantisation error data; when the computer program is run on a processor.

According to a tenth aspect the invention provides a computer program, comprising: code for generating quantisation error data relating to a data quantisation process, and code for storing the quantisation error data for subsequent use in the data quantisation process; when the computer program is run on a processor.

DESCRIPTION OF THE DRAWINGS

For a more complete understanding of example embodiments of the present invention, reference is now made to the following descriptions taken in connection with the accompanying drawings in which:

FIG. 3 is a flow diagram illustrating a method of the first example embodiment for calculating the quantisation error resulting from a colour quantisation process;

FIG. 4 is a diagram of an example colour quantisation error look-up table resulting from the process of the example of FIG. 3;

FIG. 7 is a table illustrating a process for performing colour quantisation in the second example embodiment of the invention;

FIG. 8 is table illustrating a process for determining colour quantisation error;

FIG. 9 is a table illustrating a process for determining colour quantisation error per channel for storage in a look-up table in the second example embodiment;

FIG. 10 is a flow diagram illustrating a colour quantisation and dithering process of the second example embodiment; and FIG. 11 is a flow diagram illustrating the quantisation error look-up process in the second example embodiment.

DETAILED DESCRIPTION OF EXAMPLE EMBODIMENTS

Figure 1:
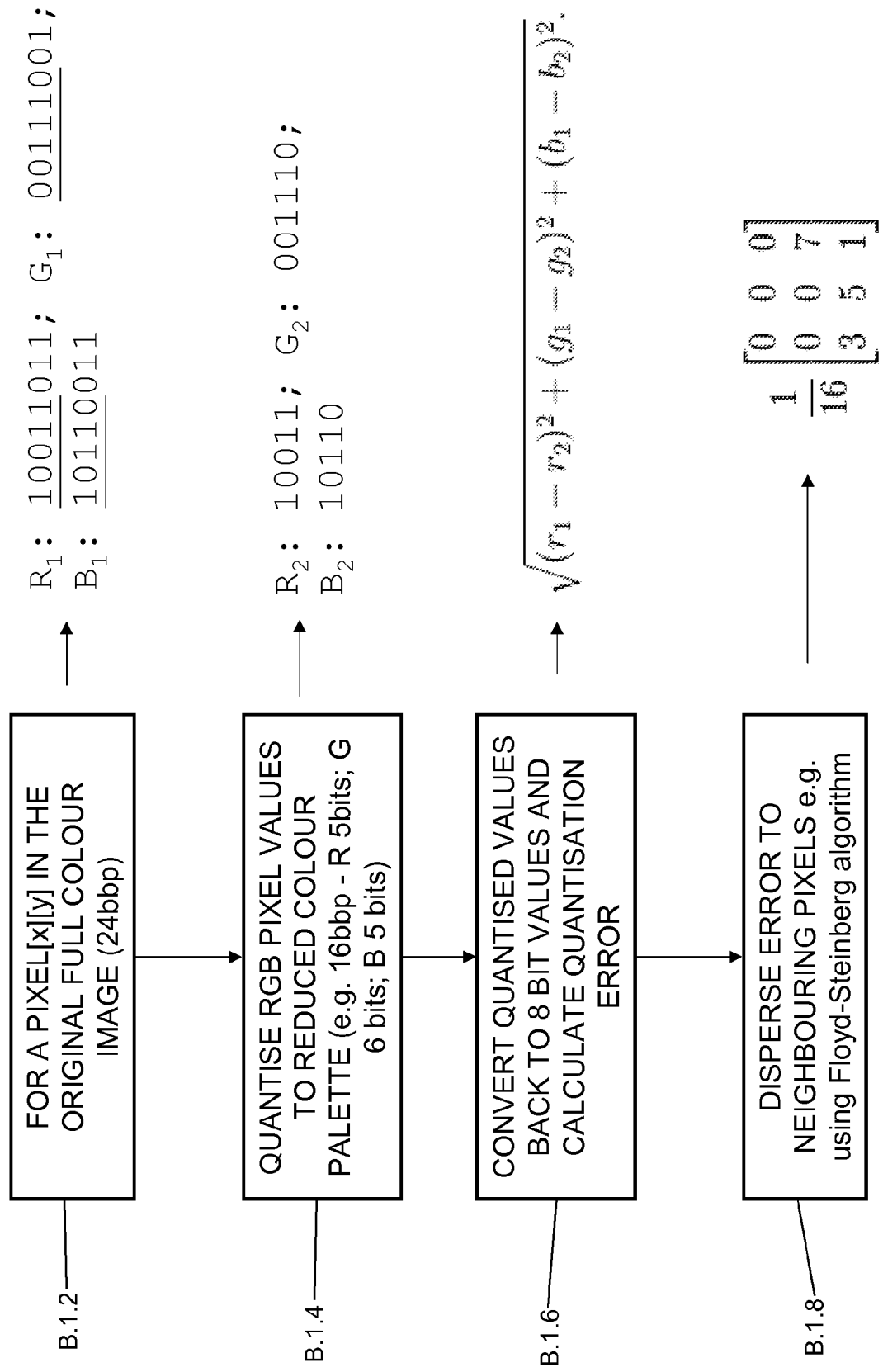
FIG. 1 is a flow diagram illustrating a colour quantisation and dithering method.

The more information that is used to represent colours in an image, the greater the number of colours that can be displayed. For example, so called "full-colour" or "true colour" displays require 24 bits per pixel, with each of the red, green, and blue channels having 8 bits, giving 256 different colour levels in each channel, to give 16,777,216 different colours. However, many devices and displays are incapable of displaying such high colour resolution, and instead are capable of displaying so-called "high-colour" images only, where only 16 bits (or in some examples 15-bits) are used to represent the colour: 5 bits for red and blue channels, and 6 bits (5 bits in 15-bit high colour) for the green channel.

The process of converting from 24 bit colour to 16 bit or 15 bit colour is known as colour quantisation, and several colour quantisation algorithms are known. For example, a so-called "median-cut" algorithm can be used to find the 64 k colours that best match the original 24-bit data. In another example, the so-called "octrees" algorithm can be used. In addition, where the lower colour palette is fixed, one quantisation technique that can be used is to find the closest colour in the lower colour palette to the 24-bit colour, by attempting to minimise the Euclidean distance in RGB colour space.

In an example of the invention, a very simple quantisation can be obtained by simply taking the n most significant bits (MSBs) of the individual colour channel 8-bit bytes, where n is the number of bits per channel in the lower colour palette i.e. in one example 5 for red and blue, and 6 for green.

Howsoever colour quantisation is performed, a quantisation error may result from the down-sampling from 8-bits per colour channel to 5 or 6 (or fewer) bits per colour channel. However, this quantisation error can be used in a dithering process, to adapt the colours of surrounding pixels to try and fool the human eye into thinking that there are more colours in the palette than in fact there are. In a dithered image, colours not available in the palette are approximated by a diffusion of coloured pixels from within the available palette. The human eye perceives the diffusion as a mixture of the colours within it.

One well-known dithering algorithm is the Floyd-Steinberg dithering algorithm, although others are also known. In essence, the Floyd-Steinberg algorithm determines a quantisation error using the difference between the original high-colour pixel and the lower-colour index with which the image will be displayed. It then disperses the quantisation error to neighbouring pixels by adjusting the values of the colour channels in the neighbouring pixels with a portion of the quantisation error. In particular, according to the classic Floyd-Steinberg algorithm, 7/16 of the error are transferred to the pixel to the immediate right, 3/16 to the pixel below and to the left, 5/16 to the pixel immediately below, and 1/16 to the pixel below and to the right. The adjusted pixel values are then used as inputs to the colour quantisation process when applied to the adjusted pixels. In this respect, classic Floyd-Steinberg dithering processes the image in a raster scan from the top left pixel in the image.

FIG. 1 illustrates the above discussed processes systematically. In block 1.2 a 24-bit (8 bits per colour channel) pixel at position [x][y] in an image is to be processed. At block 1.4 the RGB pixel values are colour quantised to produce 16 bits per pixel. In this example, 5 bits are assigned to each of the red and blue channels, and 6 bits to the green. In this example, quantisation is accomplished by taking the 5 most significant bits of the 8 bit red and blue channels for the quantised red and blue channels, and the 6 most significant bits of the 8 bit green channel for the quantised green channel.

One of the slowest parts of the dithering process can be the determination of a quantisation error for each pixel. In this example quantised colour values are converted back to 8-bit values in order to allow for computation of the quantisation error, in order to find differences with the original 8-bit values, as shown at block 1.6. This determination of the quantisation error can be slow because it makes a double conversion from a 24 bpp pixel to 16 bpp pixel to calculate the new quantised values of the original pixel values, and then from 16 bpp pixel to 24 bpp pixel to calculate the quantisation error which will be dispersed to neighbouring pixels. Image dithering by virtue of error dispersion using, in this example, the Floyd-Steinberg algorithm (or similar) is then performed at block 1.8.

In the example of FIG. 1, therefore, the quantisation error (QE) is calculated by conversion from 16 bits back to 24 bits (8 bits per channel), and this conversion is undertaken for every quantised pixel. As noted, this can take a considerable amount of processing time, and results in conversion from a 24 bit colour image to a lower colour image (16 bit, 15 bit, or lower) taking an appreciable amount of time.

Figure 2:
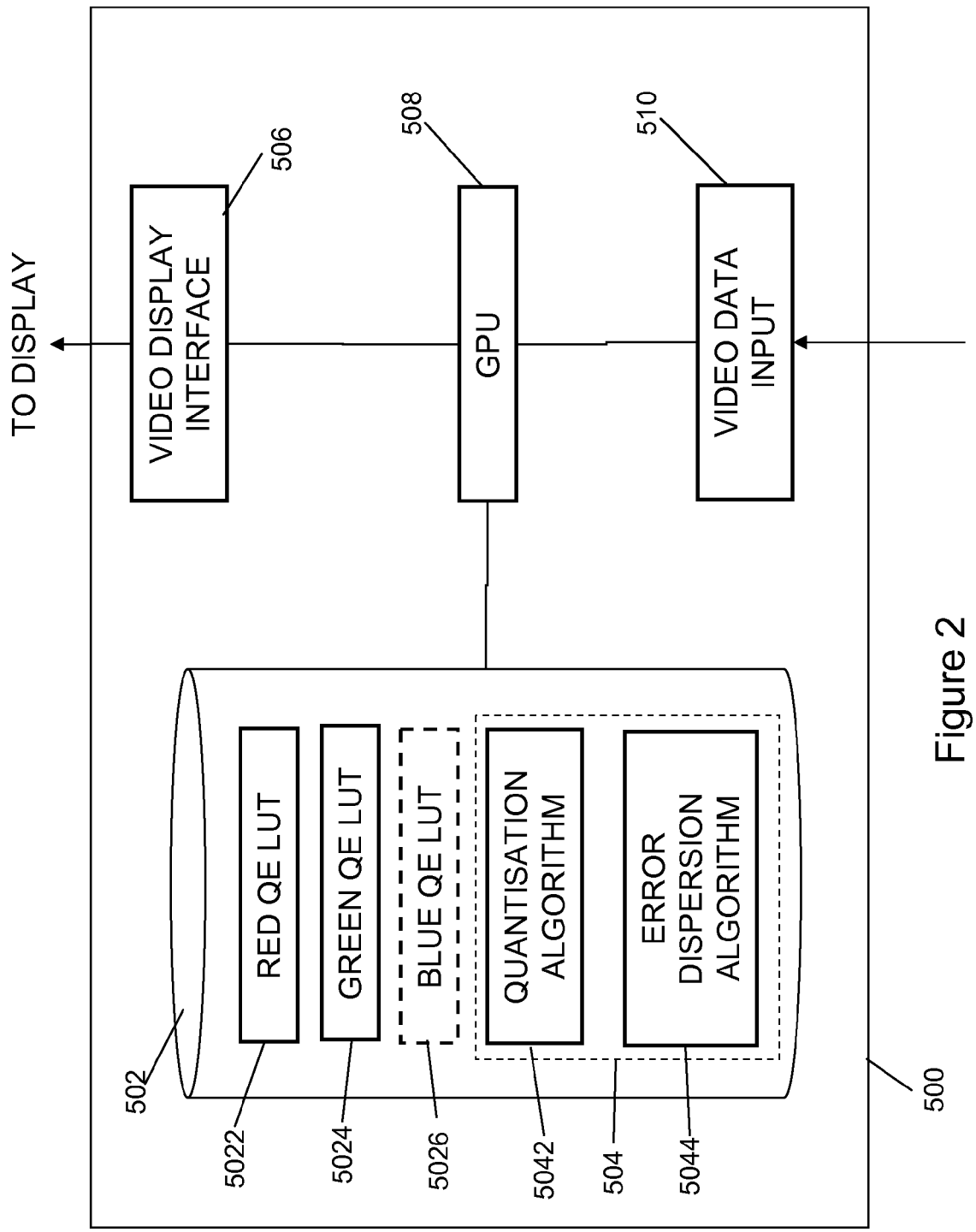
FIG. 2 is a block diagram showing a graphics processing element of a first example embodiment of the invention.

In order to reduce the amount of time taken for conversion, a first example embodiment of the invention shown in FIG. 2 provides for the quantisation error to have been calculated in advance, and stored in lookup tables (LUTs) so that the pre-calculated results are readily available in indexed form. In particular, in this example, a LUT is provided for each colour channel that has a different number of bits representing the channel in the low colour index. Thus, for example, where the blue and red channels each have 5 bits assigned to them, the same look-up table of quantisation errors can be used for both channels, as the quantisation error for each channel should be same for the same input level i (0000 0000 to 1111 1111), provided that the same quantisation technique is applied to each channel. However, for the green channel, where 6 bits are assigned, different quantisation errors may result for the same input level i, and hence a different LUT of QEs can be provided with the green channel. Generally, in this example, the same LUT of QEs can be used for those colour channels (e.g. R, G, or B) which are quantised to the same number of bits e.g. 5 bits, using the same quantisation algorithm. In another example, if a different quantisation algorithm is used for a colour channel than other colour channels, then a separate LUT of QEs resulting from the use of that quantisation algorithm is used.

FIG. 2 illustrates an image processing element 500 of the first example embodiment arranged to make use of the pre-calculated LUTs of QEs. Image processing element 500 may be, for example, a graphics card or the like, or a graphics chip installed in an embedded device. In other examples it may be implemented by a general purpose processor provided with appropriate image processing software.

Image processing element 500 of the first example embodiment receives, at video data input interface 510, video data to be displayed. For example, 24 bit colour image data is received from another element in a system, such as, for example, another application running in a computing device of which image processing element 500 forms a part. For example, video data in the form of still or moving images may be received from a camera application, or from an image browsing application. In other examples, the video data may be data generated by an application itself, for example to provide the user interface to the application for display on the screen. In other examples, an operating system of the device may provide the video data, in order to provide a graphical user interface (GUI) for the device or system as a whole.

In the present example the video data received at the video data input interface 510 is passed to a graphics processing unit (GPU) 508, being a graphics processor arranged to process the received video data in order to be able to display it on a display of the device or system. In the present example GPU 508 has access to storage in the form of memory 502, in which is stored data to allow the GPU to perform its functions, as well as control software, such as various image and video processing software implementing image and video processing algorithms. In the present example data in the form of a first LUT 5022 storing quantisation error data for the red colour channel is stored, as well as a second LUT 5024 storing quantisation error data for the green colour channel. In one example additionally stored may be a third LUT 5026 storing quantisation error data for the blue colour channel, if the blue colour channel is quantised differently than the red channel. However, in the first example embodiment the blue channel is quantised to the same number of bits as the red channel using the same quantisation technique, and hence the LUT for the red channel is also used for the blue channel.

In addition to storing the LUTs 5022 and 5024, in the present example embodiment the memory 502 also stores a dithering program 504. The dithering program 504 has as part of it a quantisation algorithm 5042 that acts to quantise a higher colour input to a lower colour index, using any one of the techniques discussed earlier. In addition, the dithering program also includes an error dispersion algorithm, to disperse the QE for a pixel to surrounding pixels. For example, the error dispersion algorithm may be the Floyd Steinberg algorithm, or similar.

In the first example, image processing element 500 also includes video display interface 506, that in use receives processed video display data from the GPU 508, and acts to control a display to display the data. For example, video display interface 506 acts to control a display screen of a device or system of which image processing element 500 forms a part to display the image or video data received from GPU 508.

As will be described in more detail, in the present example embodiment image processing element 500 receives, at the video data input 510, higher colour video or image data, such as 24 bit colour data. The GPU 508 then uses the dithering program 504 to reduce the colour depth of the image, by quantising the individual pixels to a lower colour level, such as 16 bit colour, using the quantisation algorithm 5042. In the first example embodiment instead of the quantisation error being individually calculated for each pixel, it is instead looked up for the colour channels of each pixel from the appropriate QE LUT 5022 or 5024 (or 5026, if blue is quantised differently to red or green). The looked up quantisation error is then dispersed to surrounding pixels by the error dispersion algorithm 5044, for example using the Floyd-Steinberg filter mask, or similar. It should be noted that although in the described embodiment a determination of QE is made for each pixel, it is not necessary that this is done for each pixel. In some other embodiments, a certain number of pixels or channels could be selected from an image, and only for these pixels or channels could a QE be determined.

FIG. 3 gives further details of how the quantisation error lookup tables are produced. In particular, FIG. 3 shows a process used in the present example embodiment to produce the QE LUTs 5022 and 5024 (and 5026, if necessary) in advance, such that they may then be stored in the memory 502 of the image processing element 500. In the present example embodiment, image processing element 500 is provided with the QE LUTs in advance, and does not calculate them itself. Hence, in the present example embodiment there is no requirement for image processing element 500 to be able to perform the process of FIG. 3, as this can be performed by a different processing element in advance, and the resulting QE LUTs provided to image processing element 500 for storage in memory 502, for example as part of the fabrication or initialisation of image processing element 500.

In other examples, the image processing element is provided with code to allow it to perform the process of FIG. 3. In this way, image processing element 500 is able to calculate the QE LUTs itself. This may have advantages, for example if any of the QE LUTs become corrupted, then the image processing element can re-generate them. In addition, if, for example, the quantisation algorithm used by image processing element 500 is updated or changed, then different quantisation error tables will be required, and these could then be generated by image processing element 500 using the process of FIG. 3.

Referring to FIG. 3, in the present example embodiment firstly at block 3.2 a colour channel is selected for which a LUT is to be generated. Each colour channel is processed in turn—the order is not important. In the present example, where blue is quantised the same as red, there is no need to generate a LUT for the blue channel (or conversely, to generate a LUT for the red channel, if an LUT is generated for the blue channel). Next, at block 3.4 a processing loop is commenced to process every possible colour intensity level value i in a colour channel in the input image. In the present example, this means i counts from 0 (0000 0000) to 255 (1111 1111), to account for the 256 colour levels present in an individual colour channel in the 24 bit input image.

In other examples where different colour indexes are used, the counter commenced at block 3.4 counts the number of different colour levels on each colour channel in the input image. For example, where a 16 bit colour image is to be down converted (for example to 256 colours), and QE LUTs to be generated for use, the counter would count from 0 to 31 for the red (and blue) channels, and from 0 to 63 for the green channel (assuming that 5 bits are used for red and blue, and 6 bits for green).

Next, at block 3.6 in the present example embodiment the colour channel having level i is quantised to the lower colour palette. In the present example, this means that an 8 bit colour level i is quantised to a 5 bit colour level (for red or blue) or 6 bit colour level (for green). The quantisation algorithm used here should, in this example, be the same as that which is used to actually perform colour quantisation on actual images i.e. the same quantisation algorithm as is used by image processing element 500 as quantisation algorithm 5042.

Following quantisation, at block 3.8 in the present example embodiment the quantisation error (QE) resulting from the quantisation of colour level i to the lower colour palette is calculated. Here, the same quantisation error calculation as described previously in respect of B.1.6 may be used. That is, the quantised 16 bit colour is converted back to 24 bit, and a difference between the quantised colour and the input colour determined. The determined quantisation error Q(i) for colour level i is then saved, at block 3.10, in an appropriate colour LUT, as entry i.

Following the above, at block 3.12 in the present example embodiment an evaluation is performed as to whether all the colour levels i in a particular colour channel have been processed, and if not i is incremented (or decremented, depending on which end of the range it started at), and processing repeats again from block 3.6. In this way, a quantisation error Q(i) is found for every colour level i in a colour channel colour, and stored in an appropriate LUT colour_ERROR_LOOKUP_TABLE(i). Once all the colour levels i for a colour channel colour have been processed, block 3.14 causes the next colour channel to be processed, in order to generate a quantisation error look-up table for that colour channel, again containing a QE for all the colour levels i in that channel.

FIG. 4 shows an example colour_ERROR_LOOKUP_TABLE(i) of the present example embodiment for an 8 bit colour channel colour from a 24 bit colour image. In this example wach colour level i from 0000 0000 to 1111 1111 (i.e. 0 to 255) has an entry, with an associated calculated quantisation error. Note that in this example a QE is assigned an integer value, and may take a positive or negative value. The calculated errors shown in FIG. 4 are for illustration only—the actual quantisation errors for the pixel values shown will depend on the quantisation algorithm used. It should be noted that in other embodiments, QEs could be calculated for only some colour levels.

Figure 5:
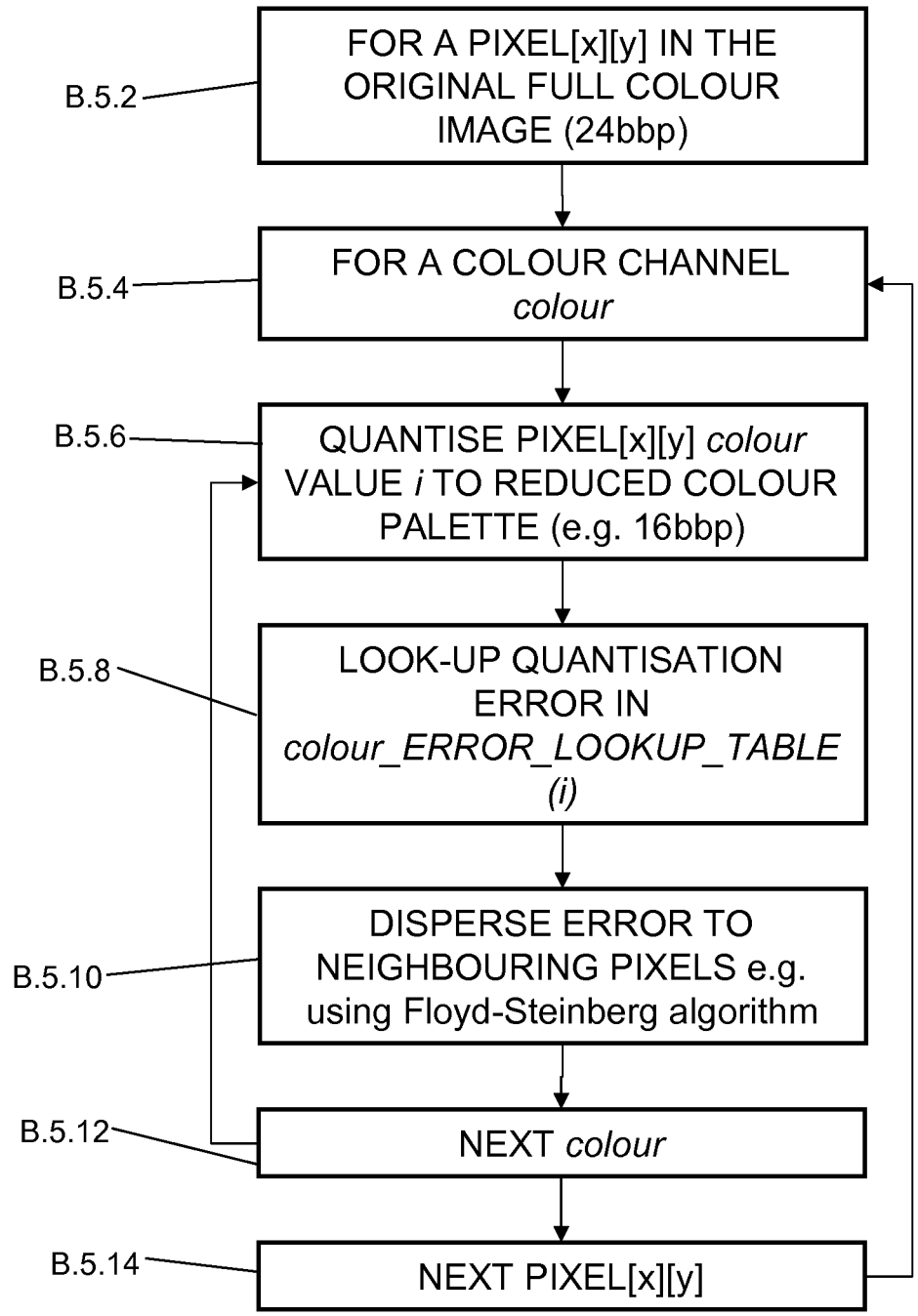
FIG. 5 is a flow diagram of a colour quantisation and dithering method of the first example embodiment of the inventions.

Having found the quantisation errors and stored them in LUTs as described above, and having provided them to image processing element 500, the operation of image processing element 500 in the first example embodiment in processing an input image, and in particular to dithering an image, will now be described with respect to FIG. 5.

Assume first that a higher colour image has been input to video data input interface 510, and is required to be displayed on a lower colour display. For example, a 24 bit true colour image is required to be displayed on a 64 k colour, 16 bit display. In the first example embodiment GPU 508 in the image processing element will need to quantise the input image to the required 16 bit colour level using quantisation algorithm 5042, and apply error dispersion algorithm 5044 to dither the image so as to improve the perceived image quality, and increase perceived colour depth.

In order to achieve the above in the first example embodiment, firstly a processing loop is commenced at block 5.2, that causes each pixel[x][y] in the image to be processed in turn. In the present example embodiment processing is performed as a line raster scan from the top left corner of the image, but in other examples different processing scan patterns may be used, with suitably adapted error dispersion algorithms to disperse the quantisation error to pixels that have yet to be processed according to the processing scan pattern chosen.

Next within the first example embodiment a second, nested, processing loop is started, in order to cause each colour channel colour to be processed in turn. Thus, for example, the red, green, and blue colour channels of pixel [x][y] are processed in turn.

In the first example embodiment within the nested processing loops lie blocks 5.6, 5.8, and 5.10, each of which are working on colour intensity level i of channel colour of pixel[x][y]. At step 5.6 colour level i is quantised to the reduced colour palette, using quantisation algorithm 5042. Then, according to the first example embodiment, rather than calculating the quantisation error, at block 5.8 the error is instead looked up from the appropriate QE LUT, using colour level i as an index thereto. For example, where the red channel of pixel[x][y] is being quantised, then the quantisation error for the red channel is looked up from the red QE LUT 5022. Where the green channel of pixel[x][y] is being quantised, then the quantisation error for the green channel is looked up from the green QE LUT 5024. For the blue channel, because the blue channel is quantised the same as the red channel, then the red QE LUT can be used, using blue colour level i as an index thereto. In other examples, if the blue channel is quantised differently to the red channel, then the blue channel QE would be looked up from the blue QE LUT 5026.

Once the quantisation error has been looked up from the appropriate LUT, in the first example embodiment at block 5.10 the QE is then dispersed to neighbouring pixels (yet to be processed) using error dispersion algorithm 5044. As discussed, an error-dispersion algorithm such as the Floyd-Steinberg algorithm may be used.

Following block 5.10, evaluations are performed at blocks 5.12 and 5.14 to determine whether the processing loops have respectively completed. As noted above, the effect of the processing loops is to perform quantisation and error dispersion functions on each of the pixels of an input image in order to reduce the colour levels, and to dither the image. However, because quantisation errors are looked up from pre-calculated LUTs, rather than calculated individually for each pixel, the dithering process can occur much more quickly.

A second example embodiment will be described next with respect to FIGS. 6 to 11.

Figure 6:
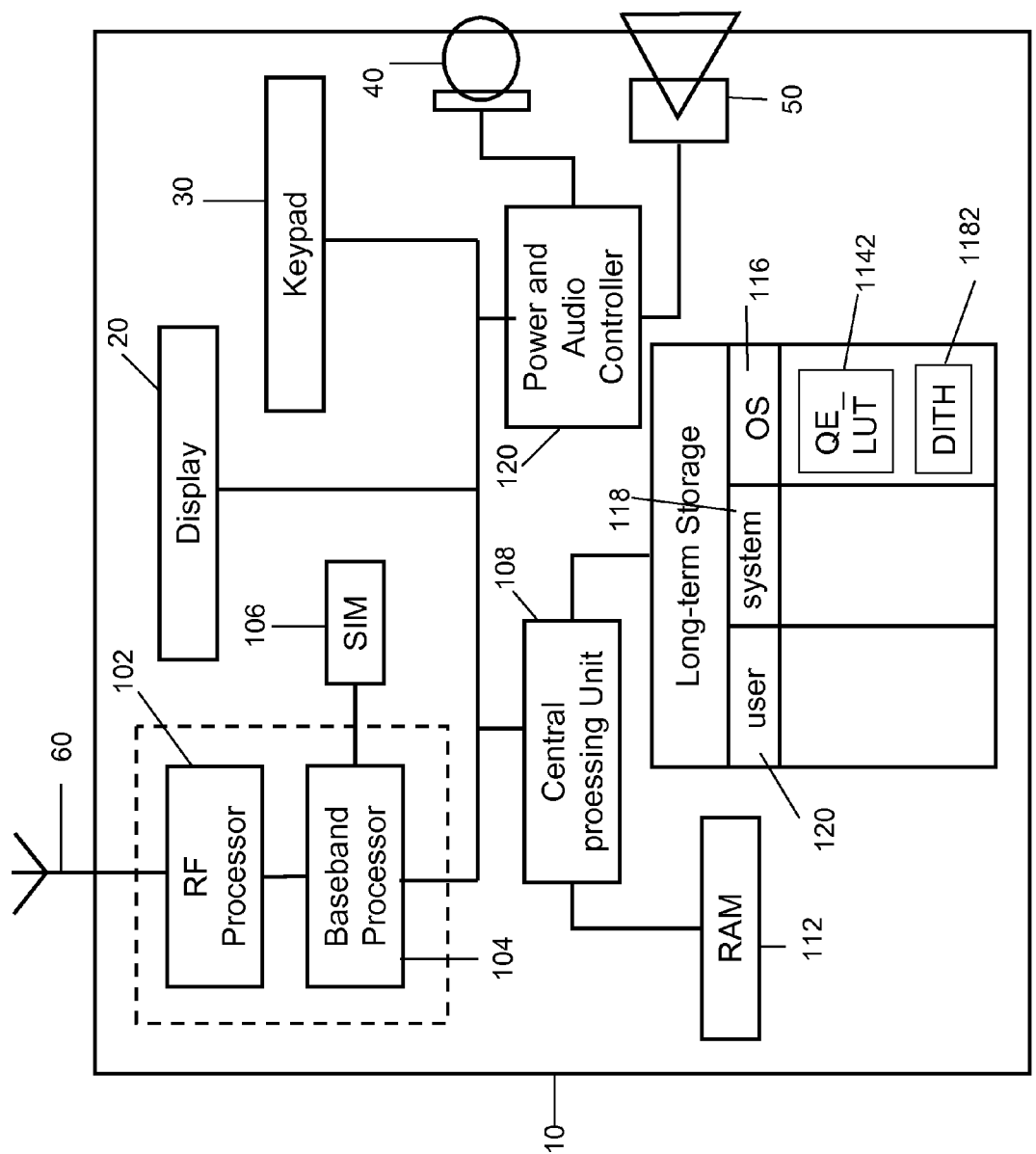
FIG. 6 is a block diagram of a smartphone providing a possible platform for a second example embodiment of the invention.

FIG. 6 represents a smartphone 10 of the second example embodiment that comprises a keypad 30, a display screen 20, a microphone 40, a speaker 50 and an antenna 60. The smartphone 10 is capable of being operated by a user to perform a variety of different functions, such as, for example, hosting a telephone call, browsing the internet or sending an email, as well as displaying images.

FIG. 6 also shows a schematic view of some of the internal hardware elements of the smartphone 10 of the second example embodiment. With reference to FIG. 6, the smartphone 10 comprises hardware to perform telephony functions, together with a central processing unit (CPU) 108 and corresponding support hardware to enable the phone to have other functions which are desired by a smartphone, such as messaging, internet browsing, email functions and the like. In FIG. 2 the telephony hardware is represented by the RF processor 102 which provides an RF signal to the antenna 60 for the transmission of telephony signals, and the receipt therefrom. Additionally provided is baseband processor 104, which provides signals to, and receives signals from, the RF processor 102. The baseband processor 104 also interacts with a subscriber identity module 106.

In this example, the keypad 30 and the display 20 are controlled by the CPU 108. A power and audio controller 120 is also provided to supply power from a battery to the telephony subsystem, the CPU, and the other hardware.

Additionally, in this example the power and audio controller 120 also controls input from the microphone 40, and audio output via the speaker 50.

In order for the CPU 108 to operate, in this example embodiment various different types of memory are provided. Firstly, the smartphone 10 includes Random Access Memory (RAM) 112, connected to the CPU 108, into which data and program code can be written to and read from at will. Code placed anywhere in RAM can be executed by the CPU 108 from the RAM. RAM 112 represents a volatile memory of the smartphone 10.

Secondly, in this example the smartphone 10 is provided with non-volatile long-term storage 114 connected to the CPU 108. The long-term storage 114 comprises in this example three partitions, being an operating system (OS) partition 116, a system partition 118 and a user partition 120. In this example embodiment, the OS partition 116 contains the firmware of the computing device which includes an operating system. An operating system is provided in order for the CPU to operate and therefore, the operating system should be started as soon as the smartphone system 10 is first switched on.

As stated, the representation of FIG. 6 is schematic only. In practice, the various functional components may be provided in fewer or in more components than are shown. For example, the long-term storage 114 may comprise NAND flash, NOR flash, a hard disk drive or a combination of these. In other examples different storage devices may be used.

In the second example embodiment presently described the CPU 108 runs a central repository server which controls and manages various software elements on the computing device. One of the roles of the central repository server in this example is to organise and manage the various firmware settings stored on the OS partition 116. For example, the central repository server stores and maintains cyclic redundancy check values for the firmware settings and thereby detects when any of the settings have been corrupted. Typically, in this example permission to write to the OS partition 116 is restricted to avoid corruption of the data it contains and thereby, preserve the integrity of the computing device. Accordingly, in this example the OS partition 116 can be thought of as a read-only portion of the long-term storage 114.

In the presently described second example embodiment other computer programs may also be stored on the long-term storage, such as application programs, software modules, and the like. In particular, in this example application programs which are used for basic operation of the device, such as, in the case of a smartphone, communications applications and the like, are typically stored in the system partition 118. In this example the application programs stored on the system partition 118 may be those which are bundled with the smartphone by the device manufacturer when the phone is first sold. In this example permission to write to the system partition 118 is less restricted than the OS partition 116 because the data contained on the system partition 118 is often not as important to the device's basic operation. Accordingly, in this example the system partition 118 can be thought of as a writable portion of the long-term storage 114.

In this example application programs which are added to the smartphone by the user would usually be stored in the user partition 120.

As noted, the OS partition 116 stores software modules forming part of the OS of the smartphone 10. In this example this includes image and video processing software modules that allow the display 20 to display image and video data. In this respect, in this example, display 20 is capable of displaying 16 bit colour images, but is not able to display 24 bit colour images. Thus, where a 24 bit colour image is to be displayed, it is quantised to 16 bits in order for the display 20 to be able to display the image. In addition, in order to improve perceived image quality, in this example dithering, such as Floyd-Steinberg dithering, may also be applied to the image during or after the quantisation process. In these respects, therefore, in this example OS partition 116 stores a dithering program 1182, comprising suitable quantisation and error dispersion algorithms, as well as quantisation error lookup tables (QE LUTs) 1142. In this example, two QE LUTs are stored, one for the red colour channel, and one for the green colour channel. The blue colour channel makes use of the red QE LUT, as the quantisation applied to the blue channel is the same as the red channel.

As noted above, conventionally quantisation of a 24 bit image to a 16 bit image would result in a quantisation error that is then used by the dithering algorithm, and quantisation error would be calculated individually for each pixel. Exemplary pseudo-code for the determination of quantisation error when a RGB (24 bpp) pixel is to be displayed on a 64K colour (16 bpp) display is as follows:

```
(1) for each y
(2)     for each x
(3)         oldpixel := pixel[x][y]
(4)             64Kpixel := ((red(oldpixel) & 0xf8) << 8) |
((green(oldpixel) & 0xfc) << 3) | ((blue(oldpixel) &
0xf8) >> 3)
(5)         red := (64Kpixel & 0xF800) >> 8
(6)         red := red + red >> 5
(7)         green := (64Kpixel & 0x07E0) >> 3
(8)         green := green + green >> 6
(9)         blue := (64Kpixel & 0x001F )<< 3
(10)        blue := blue + blue >> 5
(11)        newpixel := rgb(red, green, blue)
(12)        quant_error := oldpixel – newpixel
```

This example process is shown in more detail in FIGS. 7 and 8. In particular, FIG. 7 shows the operation of lines (3) and (4) in more detail, which relate to the quantisation process from 24 bit colour to 16 bit colour. FIG. 8 shows the operation of lines (5) to (12) in more detail, which relate to the calculation of the quantisation error.

Describing first the example quantisation process, FIG. 7 illustrates this for each colour channel. Firstly, at row 7.1 an appropriate bit mask for each channel is used with a bitwise AND operation (the "&" operator in the C programming language) to extract the appropriate number of MSBs from the 8 bit word of each colour channel. Thus, the red colour channel is subject to a bitwise AND operation with constant 0xf8, which is 1111 1000 in binary, and hence the 5 MSBs of the 8 bit input word are obtained, followed by zeros for the three least significant bits (LSBs). The same operation is also performed on the blue channel 8 bit input word. For the green channel, because green is quantised to 6 bits, a bitwise AND operation with constant 0xfc (1111 1100 in binary) is performed, to obtain the 6 MSBs of the input green channel word. Again, the 2 LSBs are set to zero as a result of the bitwise AND operation.

Having effectively quantised the channels by the simple expedient of selecting the correct number (5 for red and blue, 6 for green) of MSBs, the obtained data words are then concatenated to obtain the 16 bit output, having removed the padding zeroes. This is performed at rows 7.2 and 7.3, where firstly appropriate bit shifts left or right are undertaken on each channel, so as to pad out the resultant data words to 16 bits, and to place the MSBs taken from the input 8 bits words in the correct place. Thus, the red channel data word obtained from row 7.1 is left shifted by 8 bits, such that the five MSBs from the red channel input word constitute the 5 MSBs of a 16-bit word. The green channel is left shifted only three places, and has 5 padding zeroes added to the front, to give a 16 bit word with the 6 MSBs of the green channel input word positioned at bits 6 to 11. Finally, the blue channel is right-shifted three bits, and has padding zeroes added on the front, to give a 16 bit word having the 5 MSBs of the 8 bit blue channel input as the 5 LSBs of the 16 bit word.

Having performed the above, a bitwise OR operation ("|" in the C programming language) is performed on the resulting 16 bit words of each channel from row 7.2, to give a 16 bit word having the red, green, and blue quantised data concatenated together.

Having quantised the 24 bit input as described, the 16 bit values are converted back to 24 bits to calculate the quantisation error, as described at lines (5) to (12) of the above pseudo code, and as described in more detail in FIG. 8. Briefly: at row 8.1 individual 16 bit masks are used to extract the individual colour channel values from the 16 bit word; at row 8.2 appropriate bit shifts are undertaken to obtain an 8 bit word per channel, containing the extracted data; at row 8.3 the zeroes that form the LSBs of each 8 bit word are replaced with copies of the MSBs from the start of the same word; at row 8.4 the obtained values are then used to look up a colour in the higher 24 bit colour palette; and then at row 8.5 a quantisation error is calculated by looking at the differences in colour values. With such an approach the determination of the quantisation error calculation can be slow because it makes a double conversion from a 24 bpp pixel to a 16 bpp pixel to calculate the new quantised values of the original pixel, and then from the 16 bpp pixel back to a 24 bpp pixel to calculate the quantisation error.

In order to try and speed up this processing, in the second example embodiment the operations of lines (5) onwards in the above pseudo code, and shown in FIG. 8, are replaced by a look-up operation, to look-up the quantisation error from a pre-calculated look-up table or tables. In particular, as noted above, OS partition 116 of smartphone 10 stores the quantisation error lookup tables 1142, being at least one each for the red channel and green channel. In this example the blue channel table would be identical to the red channel table, and hence is not stored.

In the present example the look-up tables can be prepared according to the following pseudo-code:

---

To prepare look up tables:
(1) for each I from 256
(2)  red_error_lookup_table[i] := i − ((i & 0xf8)
| ((i & 0xf8) >> 5 ))
(3)  green_error_lookup_table[i] := i − ((i & 0xfc) | ((i & 0xfc) >> 6 ))

---

This operation is shown in more detail in FIG. 9

More particularly, as shown in FIG. 9, an input colour intensity level i, which takes a value from 0000 0000 to 1111 1111 (i.e. 0 to 255 in decimal) in turn, is used as an input. The input 8 bit word is then subject to a bitwise AND operation with a suitable constant, in order to extract the n most MSBs depending on colour channel—5 in the case of the red (or blue) channel, and 6 in the case of the green channel. In this respect, this first part of the operation to obtain quantised values is the same as that performed in row 7.1 of FIG. 7, during the operation to quantise the pixels i.e. in this example the same quantisation operation is performed during the process to pre-generate the quantisation error LUTs as is used to quantise a pixel belonging to an input image.

Next, in the present example embodiment at row 9.2 the resulting 8 bit words from row 9.1 are bit shifted, to obtain LSBs for adding into the words in the next row. In particular, the red (blue) channel is right shifted by 5, such that the 3 MSBs of the input 8 bit word become the 3 LSBs of the resulting word after the shift. For the green channel, a right shift by 6 is performed, such that the 2 MSBs of the originally input word become the 2 LSBs of the resulting word after the shift. The results from rows 9.1 and 9.2 are then subjected to a bitwise OR (|) operation in row 9.3, to combine the results together. This results in the red (blue) channel having the 5 MSBs of the original input word (value i) as the 5 MSBs of the resulting word after the bitwise OR, and the 3 MSBs of the original word as the 3 LSBs of the resulting word. For the green channel, the 6 MSBs of the original input word (value i) are the 6 MSBs of the resulting word after the bitwise OR, and the 2 MSBs of the original word are the 2 LSBs of the resulting word. In this respect, at this point the resulting words are the same as the results from row 8.3 of FIG. 8 in the conventional process for calculating quantisation error.

In the present example embodiment, in order to calculate a quantisation error value Q(i) to store in the appropriate QE LUT, at row 9.4 the resulting word from row 9.3 for each channel is subtracted from the original input word for each channel, as shown. This gives the quantisation error Q(i) for an input level i, and the calculated quantisation error is then stored in the appropriate lookup table colour_error-_lookup_table(i), where colour is the appropriate colour (in this example red or green), and i is the input level that was used to generate Q(i), and that is subsequently used as an index into the table.

It should be noted that in the present example embodiment the generation of the lookup tables containing the quantisation errors need not be performed by the smartphone 10, but can instead be performed by any computing apparatus comprising a processor, memory, an input and output, and suitable code programmed to cause the processor to generate the tables according to the method described. Once generated, the tables can be stored in the OS partition 116 of the smartphone, for example during a manufacturing process, initialisation process, or software installation process of the smartphone 10.

Alternatively, in another example embodiment the smartphone 10 can be provided with appropriate software code in order to allow it to generate the QE LUTs itself, and to store them in its own memory. In some circumstances by allowing the smartphone to be able to generate the LUTs as required, increased robustness of operation may be provided, as the smartphone could be able to replace the QE LUTs in the event that they become corrupt. In addition, where a different quantisation technique is used to quantise images, for example after an operating system update, then the smartphone 10 could be able to re-calculate the QE LUTs to take into account the different quantisation algorithm.

Howsoever the QE LUTs are generated and stored, once they are available to the smartphone 10 the process of quantising an input image can proceed as shown in FIGS. 10 and 11, in the present example embodiment. In particular, at block 10.2 a 24 bpp colour image is received, each pixel[x] [y] of which will be quantised and subject to dithering. At block 10.4 pixel[x][y] is quantised using the quantisation algorithm in dithering program 1182. In this example, quantisation takes place as described previously i.e. the process of FIG. 7 described above is used.

Next, in the present example embodiment rather than calculating the QE, it is instead looked up from the stored QE LUTs 1142, at block 10.6. The procedure for so doing is shown in more detail in FIG. 11, and accords, in the present example, with the following pseudo-code:

```
(1) for each y
(2)     for each x
(3)         oldpixel := pixel[x][y]
(4)         red_quant_error :=
red_error_lookup_table(red(oldpixel))
(5)         green_quant_error :=
green_error_lookup_table(green(oldpixel))
(6)         blue_quant_error :=
red_error_lookup_table(blue(oldpixel)) // use the same
look up table for blue
```

That is, as shown in FIG. 11, for a pixel[x][y] in the full colour image (block 11.2), the red QE is found by using the red channel value of the input pixel i.e. red(pixel[x] [y]) as an index into the red_error_lookup_table (block 11.4), the green QE is found by using the green channel value of the input pixel i.e. green(pixel[x] [y]) as an index into the green_error_lookup_table (block 11.6), and using the blue channel value of the input pixel i.e. blue(pixel[x][y]) as an index into the red_error_lookup_table (block 11.8). In this example the blue channel is quantised the same as the red channel, and hence the red QE LUT can be used for both channels.

Once the quantisation errors have been looked up, error dispersion can be performed in accordance with the dithering algorithm used, e.g. in this example, the Floyd-Steinberg dithering algorithm described earlier. This has the effect of dispersing the looked up quantisation errors to surrounding pixels, such that when they come to be quantised they may be quantised to different values than would otherwise have been the case, and an image dithering effect is thus obtained.

In the first and second example embodiments, the RGB colour model is used. The description of the use of the RGB colour model is purely by way of example, and in another example embodiment other colour models, such as the YUV colour model, may also be used. In such an example, a QE LUT is pre-generated for each of the Y, U, and V channels if required. In one example, the same QE LUT may be used by two or more of the channels, if the channels are quantised in the same manner.

A third example embodiment will now be briefly described. In the first and second example embodiment a colour image with a high number of colours is quantised into a colour image with a lower number of colours, using quantisation error LUTs for substantially each colour channel (e.g. red, green, or blue). However, in the third example embodiment the same technique of using a LUT to store pre-calculated values of quantisation error can also be used on grey scale images. For example, a 256 grey scale image may represent each pixel with a single 8 bit byte, representing one of 256 available greyscale intensities. In order to reduce the size of such an image quantisation of each 8 bit pixel may take place, in order to reduce each pixel to 4 bits (16 grey scale levels) or 2 bits (4 grey scale levels) or even 1 bit (2 levels—black and white), for example. In this respect, a greyscale image can be considered the same as a single channel of a colour image.

In the third example embodiment, therefore, a quantisation error table for the greyscale image (i.e. the grey channel) can be found in advance, by inputting every possible greyscale value into the quantisation algorithm being used to find the quantised greyscale value, and then determining the difference between the quantised value and the original value to obtain the quantisation error. The quantisation errors thus obtained are then stored in a QE LUT indexed by original greyscale value.

In order to then quantise a greyscale image in the present example embodiment, substantially the same process as used for a single colour channel of a colour image can then be used. That is, for a pixel[x][y] in the greyscale image, that pixel is quantised to the new (lower) greyscale value, and the greyscale value of pixel[x][y] used as an index into the greyscale QE LUT previously obtained. The QE is then looked up at the indexed position in the LUT and is used as the pixel QE in a dithering algorithm. For example, the QE is dispersed to surrounding greyscale pixels using e.g. the Floyd-Steinberg filter. In this way, both quantisation and dithering can be readily performed for greyscale images.

A fourth example embodiment will now be described. In the first to third example embodiments the data to be quantised is image data. In other embodiments, however, including the present example embodiment, the data need not be video or image data, but may instead be data of another type, including, for example, audio data, holographic data, or other data that can be subject to quantisation. In the present example embodiment an error quantisation table is generated by inputting in turn every possible input data value. For example, where 8 bit data is used, 256 values will be input in turn. The input value is then quantised using whatever quantisation algorithm is being used (e.g. by taking the n most MSBs, where n is less than the number of data bits in an input data word), and the difference between the quantised value and the original value found as the quantisation error, and stored at the appropriate indexed place in the quantisation table. As was noted in the context of the previous examples, it is not necessary that the quantisation table should include error values for every possible input data value.

After finding the table in the present example embodiment, when quantisation of input data is to be performed, quantisation proceeds according to a quantisation algorithm being used, but instead of the quantisation error then being dynamically calculated, it is instead looked up from the QE table, using the original input value as an index thereto. The looked-up QE can then be used as an input to a data dithering algorithm, or for any other purpose.

Thus, in the fourth example embodiment, a quantisation error can be found in advance for any type of data, and then used in a subsequent quantisation process.

Without in any way limiting the scope, interpretation, or application of the claims appearing below, a technical effect of one or more of the present example embodiments disclosed herein is that on Symbian Operating System platforms, the use of the QE look-up tables rather than repeating the calculation for every pixel can represent an improvement in speed of around 25% when displaying RGB pixels on a 64K display.

Another technical effect of one or more of the example embodiments disclosed herein is that by dividing the look up tables into separate channels rather than providing an individual error value for every possible RGB pixel colour, the memory required to store the tables may be dramatically reduced.

Another technical effect of one or more of the example embodiments disclosed herein is that division into channels allows the (identical) data for the red and blue channels to be combined into a single table.

Embodiments of the present invention may be implemented in software, hardware, application logic or a combination of software, hardware and application logic. The software, application logic and/or hardware may reside on a computer, server or smartphone. If desired, part of the software, application logic and/or hardware may reside on a server, part of the software, application logic and/or hardware may reside on a computer, and part of the software, application logic and/or hardware may reside on a smartphone. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of a computer described and depicted in FIGS. 2 and 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method comprising:
    storing pre-calculated quantization error data relating to a data quantization process, wherein the pre-calculated quantization error data relates to an image pixel quantization process;
    receiving data to be quantized, wherein the data comprises a plurality of image color channels, and wherein the data to be quantized is image pixel data from an image;
    quantizing the data to reduce the number of significant bits thereof; and
    determining a quantization error for the quantized data from the pre-calculated quantization error data, wherein a first set of pre-calculated quantization error data is generated for use with two or more color channels and a second set of pre-calculated quantization error data is generated for use with a third color channel, wherein the determined quantization error is dispersed to surrounding pixels in the image, in a pattern according to an image dithering filter, and wherein use of the pre-calculated quantization error data reduces a time taken for conversion of received data relative to quantization of the received data without using the pre-calculated quantization error data.

2. The method of claim 1, wherein the pre-calculated quantization error data is stored as a table, indexed by values of the input data to be quantized.

3. The method of claim 1, wherein the determining comprises looking up a pre-calculated quantization error value in the table, using a value of the received data to be quantized as an index thereto.

4. The method of claim 1, wherein pre-calculation of the quantization error data comprises applying a quantization algorithm to a set of possible input values to obtain a set of quantized data values, and determining differences between the quantized data values and the respective input values to obtain the quantization error data.

5. A method comprising:
    generating quantization error data relating to a data quantization process, wherein a first set of the quantization error data is generated for use with two or more color channels and a second set of the quantization error data is generated for use with a third color channel, wherein the quantization error data relates to an image pixel quantization process, and wherein data to be quantized in the data quantization process is image pixel data from an image; and
    storing the quantization error data for subsequent use in the data quantization process, wherein the data quantization process is expected to disperse determined quantization error to surrounding pixels in the image, in a pattern according to an image dithering filter, and wherein use of the stored quantization error data reduces a time taken for conversion of the image pixel data relative to quantization of the image pixel data without using the pre-calculated quantization error data.

6. The method of claim 5, wherein the generating comprises:
    applying the data quantization process to a set of possible input values to obtain a set of quantized data values, and
    determining differences between the quantized data values and respective input values to obtain the quantization error data.

7. An apparatus comprising:
    at least one processor; and
    at least one memory including computer program code, wherein the at least one memory and the computer program code are configured, with the at least one processor, to cause the apparatus to perform at least the following:
    store pre-calculated quantization error data relating to a data quantization process, wherein the pre-calculated quantization error data relates to an image pixel quantization process;
    receive data to be quantized, wherein the data comprises a plurality of image color channels, and wherein the data to be quantized is image pixel data from an image;
    quantize the data to reduce the number of significant bits thereof; and
    determine a quantization error for the quantized data from the pre-calculated quantization error data, wherein a first set of pre-calculated quantization error data is generated for use with two or more color channels and a second set of pre-calculated quantization error data is generated for use with a third color channel, wherein the determined quantization error is dispersed to surrounding pixels in the image, in a pattern according to an image dithering filter, and wherein use of the pre-calculated quantization error data reduces a time taken for conversion of received data relative to quantization of the received data without using the pre-calculated quantization error data.

8. The apparatus of claim 7, wherein pre-calculation of the quantization error data comprises applying a quantization algorithm to a set of possible input values to obtain a set of quantized data values, and determining differences between the quantized data values and the respective input values to obtain the quantization error data.

9. An apparatus comprising:
at least one processor; and
at least one memory including computer program code, wherein the at least one memory and the computer program code are configured, with the at least one processor, to cause the apparatus to perform at least the following:
generate quantization error data relating to a data quantization process, wherein a first set of the quantization error data is generated for use with two or more of color channels and a second set of the quantization error data is generated for use with a third color channel, wherein the quantization error data relates to an image pixel quantization process, and wherein data to be quantized in the data quantization process is image pixel data from an image; and
store the quantization error data for subsequent use in the data quantization process, wherein the data quantization process is expected to disperse determined quantization error to surrounding pixels in the image, in a pattern according to an image dithering filter, and wherein use of the stored quantization error data reduces a time taken for conversion of the image pixel data relative to quantization of the image pixel data without using the pre-calculated quantization error data.

10. The apparatus of claim 9, wherein the generation comprises the following:
apply the data quantization process to a set of possible input values to obtain a set of quantized data values, and
determine differences between the quantised data values and respective input values to obtain the quantization error data.

11. An apparatus comprising:
means for storing pre-calculated quantization error data relating to a data quantization process, wherein the pre-calculated quantization error data relates to an image pixel quantization process;
means for receiving data to be quantized, wherein the data comprises a plurality of image color channels, and wherein the data to be quantized is image pixel data from an image;
means for quantizing the data to reduce the number of significant bits thereof; and
means for determining a quantization error for the quantized data from the pre-calculated quantization error data, wherein a first set of pre-calculated quantization error data is generated for use with two or more color channels and a second set of pre-calculated quantization error data is generated for use with a third color channel, wherein the determined quantization error is dispersed to surrounding pixels in the image, in a pattern according to an image dithering filter, and wherein use of the pre-calculated quantization error data reduces a time taken for conversion of received data relative to quantization of the received data without using the pre-calculated quantization error data.

12. An apparatus comprising:
means for generating quantization error data relating to a data quantization process, wherein a first set of the quantization error data is generated for use with two or more color channels and a second set of the quantization error data is generated for use with a third color channel, wherein the quantization error data relates to an image pixel quantization process, and wherein data to be quantized in the data quantization process is image pixel data from an image; and
means for storing the quantization error data for subsequent use in the data quantization process, wherein the data quantization process is expected to disperse determined quantization error to surrounding pixels in the image, in a pattern according to an image dithering filter, and wherein use of the stored quantization error data reduces a time taken for conversion of the image pixel data relative to quantization of the image pixel data without using the pre-calculated quantization error data.

13. A computer program product embodied on a non-transitory computer-readable medium in which a computer program is stored that, when being executed by a computer, is configured to provide instructions to control or carry out:
storing pre-calculated quantization error data relating to a data quantization process, wherein the pre-calculated quantization error data relates to an image pixel quantization process;
receiving data to be quantized, wherein the data comprises a plurality of image color channels, and wherein the data to be quantized is image pixel data from an image;
quantizing the data to reduce the number of significant bits thereof; and
determining a quantization error for the quantized data from the pre-calculated quantization error data, wherein a first set of pre-calculated quantization error data is generated for use with two or more color channels and a second set of pre-calculated quantization error data is generated for use with a third color channel, wherein the determined quantization error is dispersed to surrounding pixels in the image, in a pattern according to an image dithering filter, and wherein use of the pre-calculated quantization error data reduces a time taken for conversion of received data relative to quantization of the received data without using the pre-calculated quantization error data.

14. A computer program product embodied on a non-transitory computer-readable medium in which a computer program is stored that, when being executed by a computer, is configured to provide instructions to control or carry out:
generating quantization error data relating to a data quantization process, wherein a first set of the quantization error data is generated for use with two or more color channels and a second set of the quantization error data is generated for use with a third color channel, wherein the quantization error data relates to an image pixel quantization process, and wherein data to be quantized in the data quantization process is image pixel data from an image; and
storing the quantization error data for subsequent use in the data quantization process, wherein the data quantization process is expected to disperse determined quantization error to surrounding pixels in the image, in a pattern according to an image dithering filter, and wherein use of the stored quantization error data reduces a time taken for conversion of the image pixel data relative to quantization of the image pixel data without using the pre-calculated quantization error data.

* * * * *